United States Patent [19]

Gunther et al.

[11] Patent Number: 4,906,750
[45] Date of Patent: Mar. 6, 1990

[54] SULFOALKYL BENZOXAZOLEINYLIDENE BUTENYLIDENE THIOBARBITURIC ACID DERIVATIVES

[75] Inventors: Wolfgang H. H. Gunther, West Chester, Pa.; Frederick J. Sauter, Rochester, N.Y.

[73] Assignee: Eastman Kodak Company, Rochester, N.Y.

[21] Appl. No.: 203,957

[22] Filed: Jun. 8, 1988

[51] Int. Cl.$^4$ .................. C07D 405/06; C07D 409/06; G03G 5/06
[52] U.S. Cl. ................................... 544/300; 544/306; 548/217; 548/225; 548/231
[58] Field of Search ................................ 544/300, 306

[56] References Cited

U.S. PATENT DOCUMENTS

| | | | |
|---|---|---|---|
| 2,170,805 | 8/1939 | Brooker | 544/300 X |
| 2,170,807 | 8/1939 | Brooker | 544/300 |
| 4,473,652 | 9/1984 | Okazaki et al. | |
| 4,524,128 | 6/1985 | Edwards et al. | |
| 4,651,739 | 3/1987 | Oseroff et al. | |

FOREIGN PATENT DOCUMENTS

| | | | |
|---|---|---|---|
| 3247812 | 6/1983 | Fed. Rep. of Germany | 544/300 |
| 710846 | 6/1954 | United Kingdom | 544/300 |

OTHER PUBLICATIONS

Lawrence Kass, "Identification of Normal and Leukemic Granulocytic Cells with Merocyanine 540", *Stain Technology*, vol. 61, No. 1, 1986.
B. Kalyanaraman et al., "Photodynamic Action of Merocyanine 540 on Artificial and Natural Cell Membranes: Involvement of Singlet Molecular Oxygen", *Proc. Natl. Acid. Sci.*, vol. 84, pp. 2999-3003, May 1987.
F. Sieber et al., "Dye-Mediated Photolysis of Human Neuroblastoma Cells: Implications for Autologous Bone Marrow Transplantation", *Blood*, vol. 68, No. 1, pp. 32-36, Jul. 1986.
F. Sieber et al., "Dye-Mediated Photosensitization of Murine Neuroblastoma Cells", *Cancer Research*, vol. 46, pp. 2072-2076, Apr. 1986.
F. Sieber et al., "Dye-Mediated Photolysis of Normal and Neoplastic Hematopoietic Cells", *Leukemia Research*, vol. 11, No. 1, pp. 43-49, 1987.
Cohen et al., "Changes in Axon Fluorescence During Activity: Molecular Probes of Membrane Potential", J. Membrane Biol., vol. 19, pp. 1-36, (1974), (CA 82-709885).

*Primary Examiner*—Floyd D. Higel
*Attorney, Agent, or Firm*—Irving Newman

[57] ABSTRACT

A merocyanine dye having the formula:

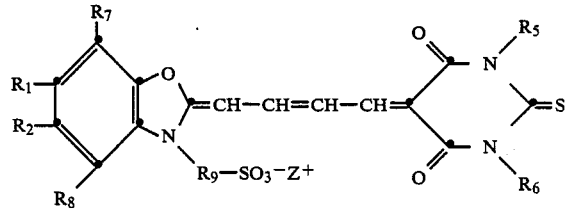

wherein:
$R_1$ and $R_2$ independently are H, alkyl, alkoxy or aryl;
$R_7$ and $R_8$ are H or
any of $R_1$ and $R_2$, $R_1$ and $R_7$, and $R_2$ and $R_8$ can together comprise the atoms necessary to form a fused aromatic ring on the benzene radical to which they are attached and with the stipulation that only one of $R_1$ and $R_2$ can be H;
$R_5$ and $R_6$ comprise alkyl of from 1-18 carbon atoms, provided that the sum of the carbon atoms in $R_5$ and $R_6$ together is at least 8;
$R_9$ is an alkylene group of 2-9 nuclear carbon and hetero atoms; and
$Z^+$ is a cation.

This dye is useful in a method for inactivating viruses comprising contacting the viruses with the compound and exposing the resulting mixture to visible light to excite and inactivate the viruses. The compounds are also useful in the irradiation-induced inactivation of leukemia cells.

3 Claims, No Drawings

SULFOALKYL BENZOXAZOLEINYLIDENE BUTENYLIDENE THIOBARBITURIC ACID DERIVATIVES

BACKGROUND OF THE INVENTION

Viruses can cause human or animal diseases. The inability to effectively inactivate pathogenic viruses without adversely affecting their antigenic properties has made it difficult to make safe, effective vaccines for viral diseases. In addition, the presence of viruses can destroy the utility of valuable food and industrial products.

Heat treatments, the extraction of virus with solvents and detergents, and the treatment with high doses of gamma radiation can be effective means of inactivating viruses. However, those procedures are rigorous and nonspecific and their applicability is limited. As a result, there is a need for a simple, effective method for inactivating viruses.

In U.S. patent application Ser. No. 933,697, entitled METHOD OF INACTIVATING VIRUSES, by Dr. F. Sieber, now U.S. Pat. No. 4,775,625 it is disclosed that a merocyanine dye MC540 and the novel merocyanine dyes of the instant invention, which were received by Dr. Sieber from the present inventor, are useful as agents which preferentially bind to the lipids in enveloped viruses or virus-infected cells and which do not or bind only minimally to the other components of the cells to inactivate the viruses and virus-infected cells. The MC540 dye and its use in eliminating tumor cells from bone marrow grafts is described in "Elimination of Residual Tumor Cells from Autologous Bone Marrow Grafts by Dye-Mediated Photolysis: Preclinical Data", by Dr. Fritz Sieber in *Photochemistry and Photobiology,* Vol. 46, No. 1, pages 71–76, (1987).

There is a need for effective compounds suitable for use with photosensitization for inactivating viruses and for removing tumor cells.

BRIEF SUMMARY OF THE INVENTION

It has been discovered that novel merocyanine dyes can be brought into contact with an effective amount of a photosensitizing agent and exposed to visible light until the viruses and virus-infected cells have been inactivated. It has been found that these novel dyes are also useful for selectively killing leukemic cells in bone marrow by photosensitization.

The novel compound has the formula:

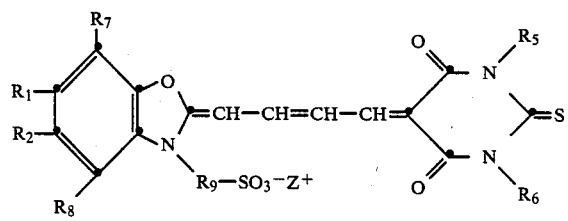

wherein:

$R_1$ and $R_2$ independently are H, alkyl, alkoxy or aryl $R_7$ and $R_8$ are H or any pair of $R_1$ and $R_2$, $R_1$ and $R_7$, and $R_2$ and $R_8$ can together comprise the atoms necessary to form a fused aromatic ring on the benzene radical to which they are attached and with the stipulation that only one of $R_1$ and $R_2$ can be H;

$R_5$ and $R_6$ comprise alkyl of from 1–18 carbon atoms, provided that the sum of the carbon atoms in $R_5$ and $R_6$ together is at least 8;

$R_9$ is an alkylene group of 2–9 nuclear carbon and hetero atoms; and $Z^+$ is a cation.

DESCRIPTION OF THE PREFERRED EMBODIMENTS

The novel compounds useful as anti-viral agents and in the inactivation of leukemia cells have the formula:

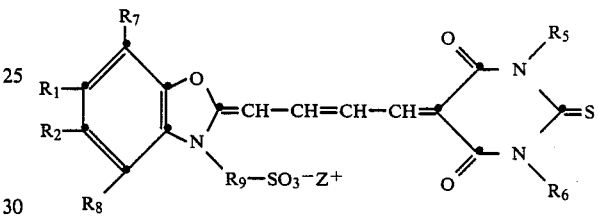

$R_1$ and $R_2$ can each independently comprise H, alkyl of about 1 to 10 carbon atoms such as methyl, ethyl, propyl, butyl, and hexyl; alkoxy such as methoxy, ethoxy, and the like, wherein the alkyl group contains from 1 to 3 carbon atoms and aryl, such as phenyl, including substituted phenyl, such as tolyl, and the like. It is noted that any one of $R_1$ and $R_2$ can be H.

$R_7$ and $R_8$ are H or any pair of $R_7$ and $R_1$, $R_1$ and $R_2$ or $R_2$ and $R_8$ can comprise the atoms necessary to form together with the atoms on the benzene radical to which they are attached, a fused aromatic ring, such as a benzo ring, including a substituted benzo ring, such as a methyl-substituted benzo ring and the like.

$R_5$ and $R_6$ comprise alkyl groups containing from about 1 to about 18 carbon atoms provided that the sum of the carbon atoms in $R_5$ and $R_6$ is at least 8 such as methyl, ethyl, propyl, butyl, heptyl, and including branched and substituted alkyl, such as chloropropyl, methoxymethyl, isopropyl, benzyl, t-butyl, sec-butyl, neopentyl, and the like.

$R_9$ is a straight or branched alkylene group of 2 to 9 nuclear atoms forming the alkylene chain including alkylene chains comprising hetero atoms, or hetero atom-containing groups in the linear alkylene chain or nucleus in the case of branched chains, for example, ethylene, ethylidene, trimethylene, propylene, propylidene, benzylidene, 3-oxo-4-imino-5,5-dimethyl-1,6-hexylene, and the like, preferably $R_9$ is a trimethylene group.

$Z^+$ is any cation such as $Na^+$, $\frac{1}{2}Ba^{2+}$, $(C_2H_5)_3NH^+$, $K^+$, $NH_4^+$, and $Li^+$.

Preferred merocyanine dyes of the invention include:

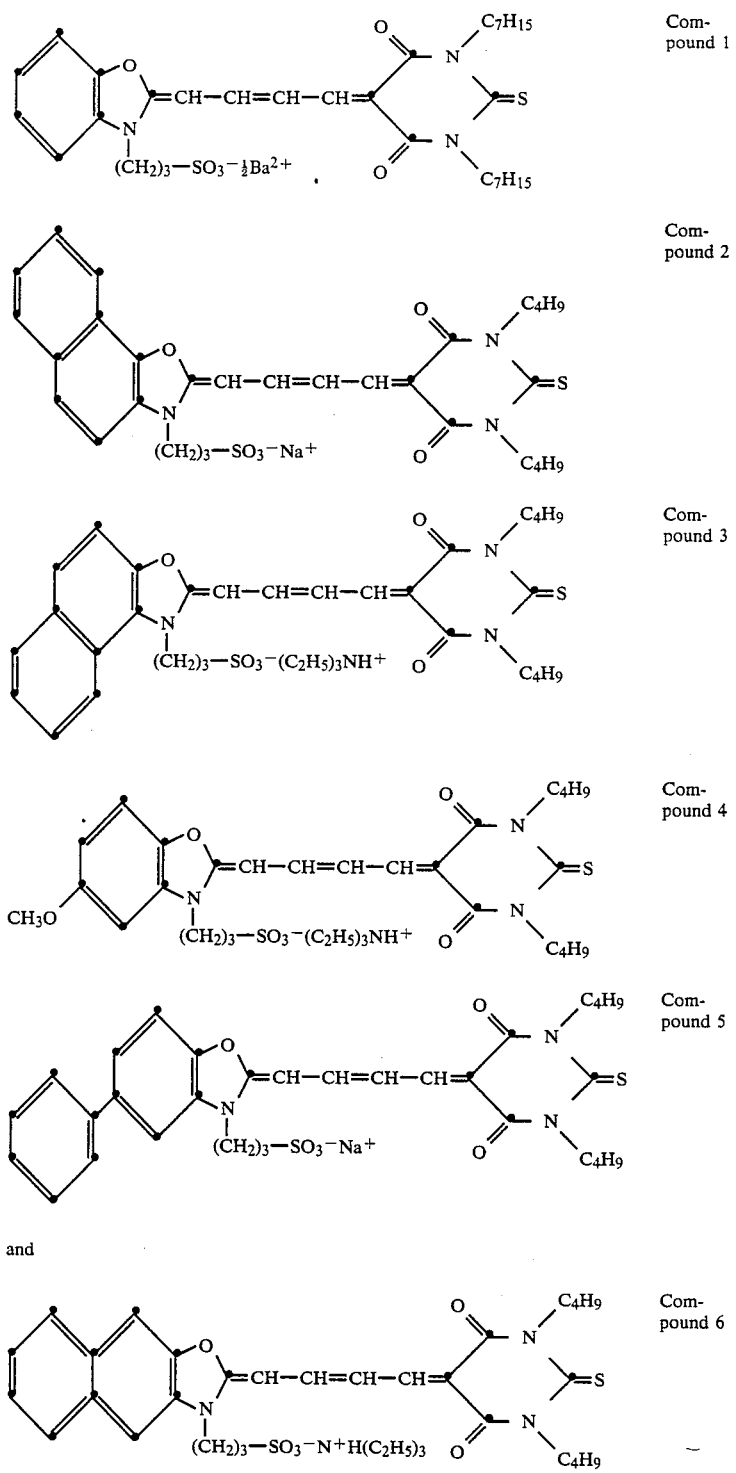

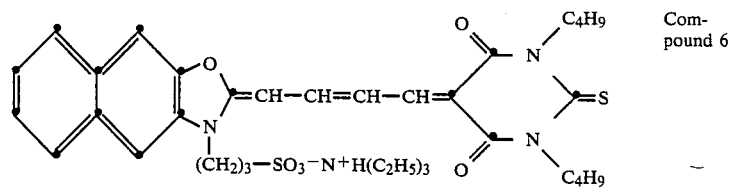

The compounds of the invention can be synthesized by condensation of a 2-methyl-3-sulfoalkyloxazolium hydroxide, inner salt with a 1,3-disubstituted 5-(3-alkoxy-2-propen-1-ylidene)-2-thiobarbituric acid in the presence of a tertiary amine such as triethylamine and a solvent such as acetonitrile or ethanol, with warming or gentle heating to form the ammonium sulfonate salt followed by cation exchange if desired (for example, treatment with sodium iodide to produce the sodium salt of the merocyanine dye or with barium acetate to form the barium salt), and finally treatment with a non-solvent if necessary to precipitate the dye.

Alternatively, a 5-unsubstituted barbituric acid can be condensed with a 2-[4-(acetanilido)-1,3-butadiene-1-yl]-3-sulfoalkyloxazolium hydroxide, inner salt under similar conditions.

The starting oxazolium hydroxide, inner salt is most conveniently prepared by an addition reaction of a sultone such as propane soltone, butane sultone, etc., to a parent oxazole such as 2-methyl[1,2-d]naphthoxazole.

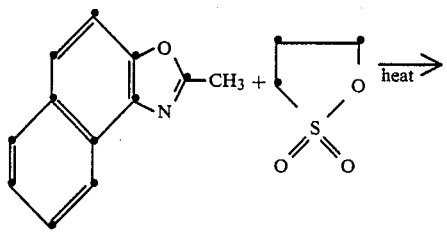

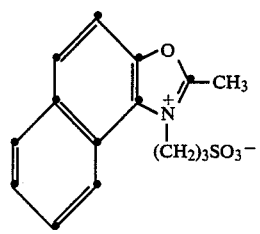

Alternatively, such inner salts can be prepared by an addition reaction between a parent oxazole such as I above and an unsaturated sulfonic acid such as 2-acrylamido-2-methylpropanesulfonic acid as follows:

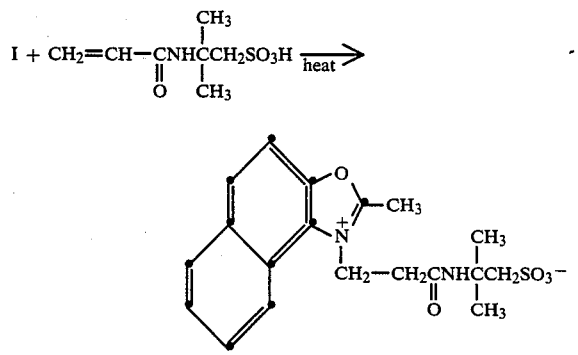

The 1,3-disubstituted-5-(3-alkoxy-2-propen-1-ylidene)-2-thiobarbituric acid derivatives are prepared by the condensation of 1,3,3-trimethoxy-1-propene with the parent 1,3-disubstituted thiobarbituric acid. The product is formed spontaneously as the reactants are mixed in acetone. The disubstituted thiobarbituric acid is obtained by condensation of an N,N'-disubstituted thiourea with diethyl malonate. The N,N'-disubstituted thioureas can be purchased commercially or prepared by conventional alkylation of the nitrogen atoms on the thiourea.

The 2-[4-(acetanilido)-1,3-butadien-1-yl]-3-sulfoalkyloxazolium hydroxide, inner salt used in the alternative procedure is prepared by reaction of the parent 2-methyloxazolium hydroxide, inner salt with 1-anilino-3-phenylimino-1-propene hydrochloride available from Aldrich Chemical Co.

These compounds have been found to be useful as agents to destroy or inactivate viruses with the aid of photosensitization. The toxicity of these compounds is relatively low.

The compounds are normally used with light of suitable wavelength in an amount of about 5 to about 25 micrograms per milliliter of product.

The effective wavelengths of visible light that can be used vary greatly depending upon the absorption spectrum of the individual dyes; however, it is generally desired that the light be of a wavelength in the green to orange range. It appears, as expected, that light that is not absorbed, i.e., blue light and long wavelength red light, is not particularly effective with these compounds.

Tests have shown that:

(1) Suspensions of Friend virus, Friend virus-transformed cells, Herpes simplex, HTLV-I and HTLV-I infected cells are rapidly inactivated by photosensitization with these compounds.

(2) The small amounts of dye that are transferred with the photosensitized products or plasma/serum components are not toxic to mice. The effective amount of some of these compounds is about 100,000 times less than the $LD_{10}$ of the compound in mice.

The ability of these compounds to react with enveloped (i.e., lipid-containing) viruses was tested with the Friend erythroleukemia virus complex, the human T cell leukemia virus, HTLV-I and Herpes simplex 1. Friend virus was obtained from cell-free supernatants of cultured erythroleukemia cells or as a cell-free extract from infected animals. Simultaneous exposure to the compounds (15 ug/ml) and light (40 J/cm$^2$) reduced the virus titer regardless of the origin of the virus preparation. Virus-infected spleen cells, bone marrow cells, and cultured Friend erythroleukemia cells were inactivated at about the same rate as cell-free virus preparations.

HTLV-I was also susceptible to the compound-mediated photosensitization. The amount of virus that could be sedimented by centrifugation was reduced after treatment with the compounds and light. The remainder of the virus were probably lysed. The small fraction that was sedimented was visibly stained by the compound. It is conceivable that the sedimented virus fraction, although not lysed, had sustained enough photodynamic damages to make it noninfectious. For example, when the virus is Herpes simplex 1, the order of magnitude reduction is as high as 45 times.

The demonstrated effectiveness of this method in inactivating Herpes simplex 1 makes it possible to treat herpes lesions by applying or injecting the compound-containing preparations onto or into the lesions.

The ability of the compounds to photosensitize in such low concentrations should make it possible to use the dyes in dermatological products which can be painted on or injected into viral-containing lesions prior to exposure to visible light.

The compound which we have labeled Compound 3 (see structural formula below) reduces illumination times about six-fold in comparison to Merocyanine 540 when used in equimolar concentrations.

Compound 3

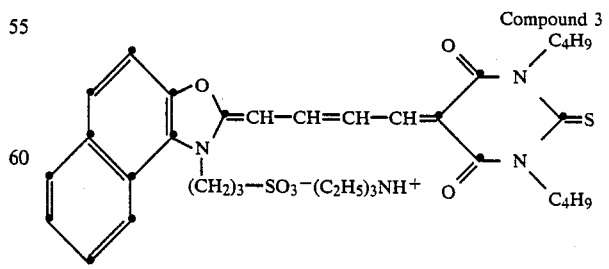

The compound-mediated photolysis of viruses appears to be primarily mediated by singlet oxygen. An additional two-fold reduction in illumination time can therefore be achieved by performing the photosensitization step in the presence of deuterium oxide (D₂O).

Unlike heat or high doses of ionizing irradiation, this compound-mediated photolysis is more selective in its toxicity. Dye-mediated photosensitization may be the preferred anti-viral treatment in situations where critical components are temperature- or radiation-sensitive. In addition, the acute systemic toxicity of these dyes is very low. Also, the amount of dye that is injected with a typical mouse bone marrow graft is more than 100,000 times less than the $LD_{10}$ in the same species.

Surprisingly, tests have shown that inactivated viruses retain their antigenic properties. Thus, it should be possible to make vaccines using the viruses inactivated by the method of the present invention.

Representative of the viruses which can be inactivated by the compounds of the present invention are those previously described as well as the viruses which cause human and animal diseases, such as bovine viral diarrhea, and viruses which infect bacterial products, such as the Epstein Barr virus.

More detailed information concerning the anti-viral process of using these compounds with photolysis is found in the previously mentioned Sieber U.S. patent application Ser. No. 933,697.

These novel compounds are also useful in eliminating residual tumor cells from bone marrow grafts by treatment with photolysis. These compounds bind to the lipid portion of the plasma membrane and the photolysis with these compounds is effective against a broad range of leukemias and solid tumors, including drug-resistant tumors. The advantageous use of these compounds is that normal circulating leukocytes and red cells have a low affinity to them and light in the presence of serum appears to have little or no acute cytotoxic effects.

This invention is further illustrated by the following examples.

EXAMPLE 1

Preparation of

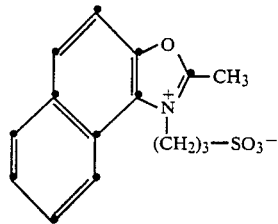

prepared from the parent 2-methylnaphthoxazole and propane sultone and 0.65 g (2 mmole)

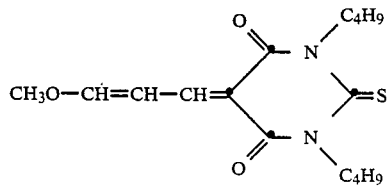

obtained from the condensation of the disubstituted thiobarbituric acid with 1,3,3-trimethoxy-1-propene. The former compound was added in 25 ml of ethyl alcohol.

To this mixture was added 0.3 ml triethylamine (TEA). The mixture was boiled for five minutes, allowed to cool and filtered. 50 ml of ethyl alcohol was added and the mixture was again filtered.

The product. (0.7 gram) had a calculated molecular weight of 698.95, γ-max of 565 nm in methanol, an extinction coefficient $\epsilon = 13.1 \times 10^4$, and a fluorescence emission maximum at 594 nm. The UV visible spectrum is consistent with the assigned structure and the compound was shown to be pure by both electrophoresis and thin layer chromatography.

EXAMPLE 2

Preparation of

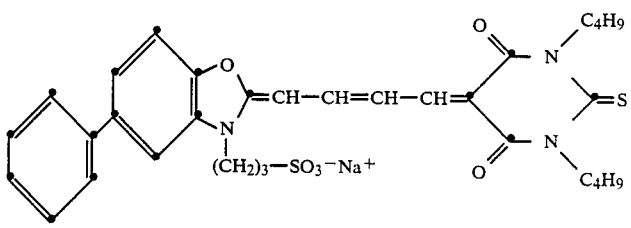

To a reactor was added 0.67 g (2 mmole)

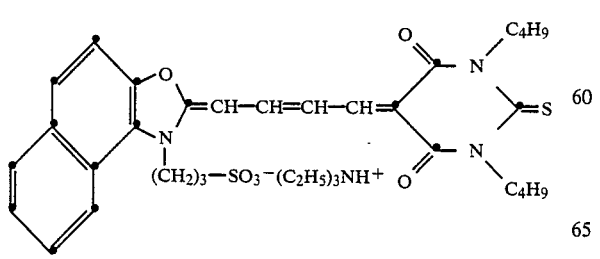

To a reactor was added 0.61 g (2 mmole) of

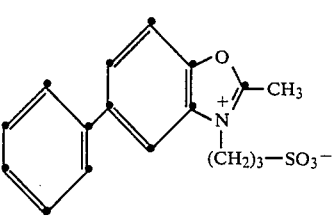

prepared from the parent 2-methyl-5-phenylbenzoxazole and propane sultone, and 25 ml ethanol. The mixture was boiled for a few minutes and 0.65 g (2 mmole)

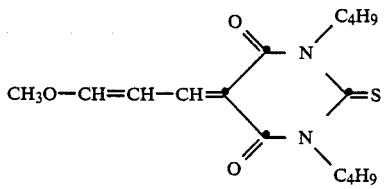

was added. To this mixture was added 0.5 ml TEA. The mixture was refluxed for five minutes and allowed to cool. It was then filtered through filter paper and 0.5 g NaI was added. This was stirred for five minutes and the product was filtered off and recrystallized from 100 ml methanol.

The resulting product (0.41 g) had a calculated molecular weight of 645.78, approximate λ-max of 560 nm in methanol, and an extinction coefficient $\epsilon = 17.3 \times 10^4$. The UV visible spectrum is consistent with the assigned structure and the compound was shown to be pure by both electrophoresis and thin layer chromatography.

EXAMPLE 3

Preparation of

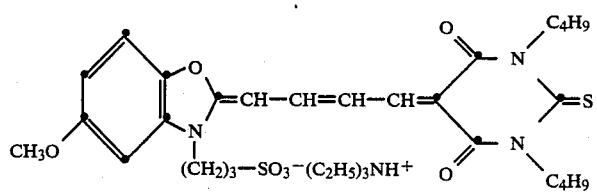

To a reactor was added 0.57 g (2 mmole) of

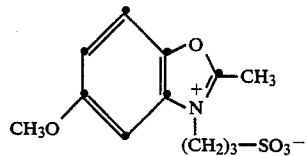

prepared from the parent 2-methyl-5-methoxybenzoxazole and propane sultone, in 25 ml of ethanol. The mixture was refluxed and 0.65 (mmole)

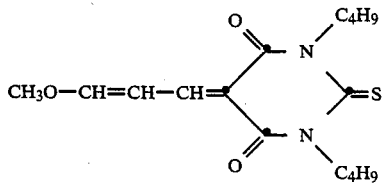

was added. To this mixture was added 0.5 ml TEA and the resultant mixture was refluxed for five minutes. The mixture was cooled for one hour, filtered, and taken up in 20 ml hot ethanol. The mixture was refluxed, filtered, and chilled to produce crystals.

The resulting product (0.52 g) had a calculated molecular weight of 662.92, a λ-max of 560 nm in methanol, a fluorescence emission maximum at 586 nm, and an extinction coefficient $\epsilon = 11.9 \times 10^4$. The UV visible spectrum is consistent with the assigned structure and the compound was shown to be pure by both electrophoresis and thin layer chromatography.

EXAMPLE 4

Preparation of

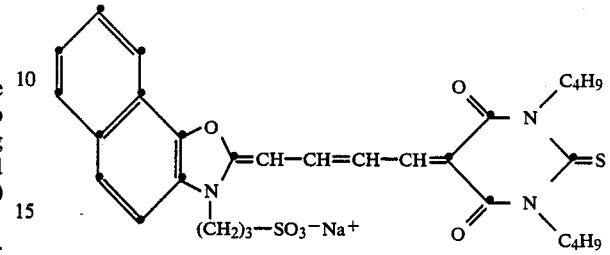

To a reactor was added 0.61 gram (2 mmole)

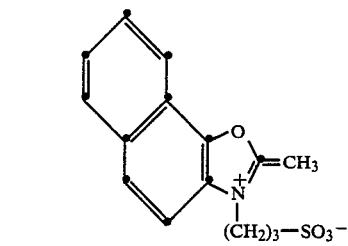

prepared from the parent 2-methylnaphthoxazole and propane sultone, in 25 ml ethanol. The mixture was refluxed and 0.65 gram (2 mmole)

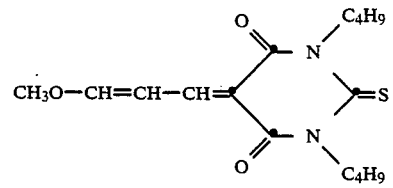

was added. To this mixture was added 0.5 ml TEA. The resulting mixture was refluxed for five minutes, filtered hot and 0.5 g NaI was added and the product filtered after stirring for 15 minutes. The product was obtained after recrystallization in 100 ml methanol.

The resulting product (0.5 gram) had a calculated molecular weight of 619.74, λ-max of 566 nm in methanol, an extinction coefficient $\epsilon = 12.6 \times 10^4$, and a fluorescence emission maximum at 595 nm. The UV visible spectrum is consistent with the assigned structure and the compound was shown to be pure by both electrophoresis and thin layer chromatography.

EXAMPLE 5

Preparation of

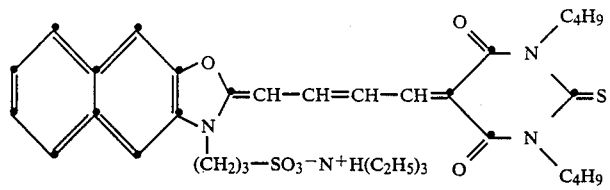

Part A

Preparation of

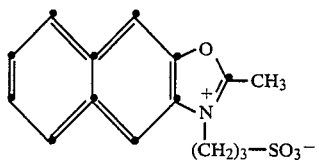

A mixture of 10 g of 2-methylnaphth[3,2-d]oxazole and 7.5 g of propane sultone was prepared in 50 ml of acetontrile and refluxed for about 70 hours. After cooling, the solid was collected, washed with acetone, then with diethyl ether, and dried to produce 8.4 g. The mother liquors were refluxed another 4.5 days and worked up the same way to produce another 2.7 g.

Part B

Preparation of

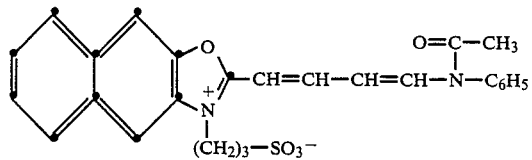

The inner salt prepared in Part A (6.0 g) was combined with 5.2 g of 1-anilino-3-phenylimino-1-propene hydrochloride in 50 ml of acetic anhydride and heated at reflux for 2 hours. At this time, a sample diluted with acetonitrile and treated with triethylamine showed no evidence of dye formation indicating that all of the starting inner salt had been converted. The mixture was cooled and added to about 350 ml of diethyl ether, stirred, the solid collected by filtration, washed first with diethyl ether and then with acetone. The cake was resuspended in acetone, collected again and washed with acetone, then with diethyl ether, and dried. Yield=9.7 g.

Part C

Preparation of the Merocyanine Dye

A mixture of the acetanilide from Part B (1.6 g) and 1,3-dibutyl-2-thiobituric acid (0.85 g) was suspended in about 150 ml of ethanol, heated to a boil, and treated with 1 g of diethylamine. The solution was seeded with a few crystals prepared by scratching a sample in a test tube and allowed to cool. The crystals were collected by filtration, washed with ethanol and with acetone, and dried to produce 1.43 g of dark crystals. These were recrystallized from 200 ml of boiling ethanol. Yield of dark blue crystals=1.17 g.

The product had a calculated molecular weight of 698.94, λ-max of 571 nm in ethanol, and an extinction coefficient $\epsilon = 25.4 \times 10^4$. A solution of 1.171 mg in 287.1 ml of ethanol had an optical density of 1.484. The UV visible spectrum was consistent with the assigned structure.

EXAMPLE 6

When cultured F4-6 erythroleukemia cells, spleen, or marrow cells from diseased animals, cell-free extracts of cultured cells, spleen cells, or marrow cells, or cell-free supernatants of F-6 cultures were injected into healthy B6D2F1 mice, the spleen weights increased from about 60–70 mg to about 1500 mg within days. The animals became polycythemic and, eventually, died. When cell suspensions, cell-free extracts, or culture supernatants were photosensitized and exposed to light prior to injection, spleen weights remained normal, hematocrits remained normal, and the animals survived. Normal pluripotent hematopoietic stem cells (as determined by the ability of photosensitized marrow cells to rescue lethally irradiated syngeneic hosts) were spared by the photosensitization treatment. Virus preparations that were exposed to dye or light alone caused splenomegaly, polycythemia, and death. A series of experiments thus showed that the compounds of Examples 1-4 with photolysis inactivates free Friend virus, intracellular Friend virus, and Friend virus-infected cells.

The result of the experiments with treated and untreated mice with (30 minutes at 70 Watts/m$^2$) and without (ambient daylight only) light treatment are shown in spleen weights in Table I below.

TABLE I

| Compound | Light | Spleen Weight (mg) |
|---|---|---|
| Normal Spleen | | |
| (no virus) | | 59. 6 |
| Spleen with Virus | | |
| (no compound) | Daylight | 1460 |
| Example 1 | Daylight | 1484 |
| Example 1 | 70 Watts/m$^2$ for 30 minutes | 56.8 |
| Example 2 | Daylight | 1332 |
| Example 2 | 70 Watts/m$^2$ for 30 minutes | 53.8 |
| Example 3 | Daylight | 1488 |
| Example 3 | 70 Watts/m$^2$ for 30 minutes | 64.6 |
| Example 4 | Daylight | 363.8 |
| Example 4 | 70 Watts/m$^2$ for 30 minutes | 67.4 |

It can be seen from the above data that light treatment with the compounds of this invention effectively inactivated the virus cells as evidenced by the resulting spleen weight after treatment.

It will be readily understood by those skilled in the art that the foregoing description has been for purposes

What is claimed is:

1. A compound having the formula:

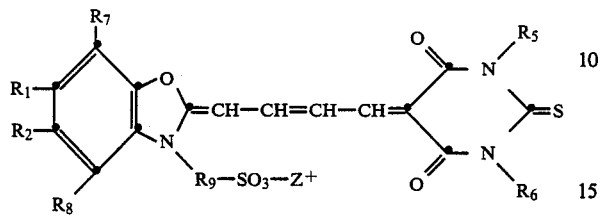

wherein:
- $R_1$ and $R_2$ may be independently selected from H, alkyl, alkoxy and carbocyclic aryl,
- $R_7$ and $R_8$ may each be H with the proviso that a pair of R's selected from the pairs $R_1$ and $R_2$, $R_1$ and $R_7$, and $R_2$ and $R_8$ together consist essentially of the atoms necessary to form a fused 6-membered carbocyclic aromatic ring on the benzene radical to which they are attached and only one of $R_1$ and $R_2$ can be H;
- $R_5$ and $R_6$ are alkyl of from 1–18 carbon atoms provided that the sum of the carbon atoms in $R_5$ and $R_6$ is at least 8;
- $R_9$ is an alkylene group of 2–9 nuclear carbon atoms and hetero atoms; and
- $Z^+$ is a cation.

2. A compound having the formula:

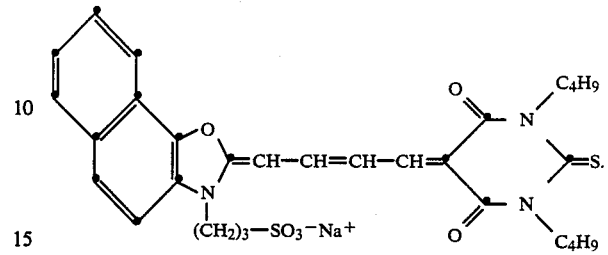

3. A compound having the formula:

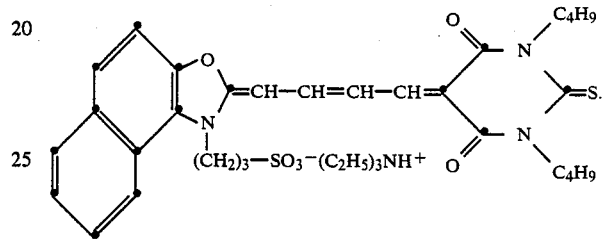

* * * * *